United States Patent [19]

Manning et al.

[11] Patent Number: 4,916,007

[45] Date of Patent: Apr. 10, 1990

[54] UNDERPRINTED INLAID SHEET MATERIALS HAVING UNIQUE DECORATIVE DESIGN EFFECTS

[75] Inventors: Andrew J. Manning, Randolph, N.J.; Edward F. Lussi, Bethlehem; William R. Marley, Saylorsburg, both of Pa.

[73] Assignee: Tarkett Inc., Parsippany, N.J.

[21] Appl. No.: 789,026

[22] Filed: Oct. 18, 1985

[51] Int. Cl.$^4$ ............................................... B32B 3/10
[52] U.S. Cl. .................................. 428/203; 428/204; 428/205; 428/206; 428/207; 428/212; 428/323; 428/327; 428/908.8; 428/913
[58] Field of Search ............ 428/204, 212, 913, 908.8, 428/203, 205–207, 323, 327, 522

[56] References Cited

U.S. PATENT DOCUMENTS 4,054,699 10/1977 Brinkley ............................ 428/908.8
4,126,727 11/1978 Kaminski ............................ 428/212
4,348,447 9/1982 Miller, Jr. et al. ............... 428/908.8

FOREIGN PATENT DOCUMENTS 85784 8/1983 European Pat. Off. ............ 428/204

*Primary Examiner*—Pamela R. Schwartz

[57] ABSTRACT

An underprinted inlaid sheet material having unique design effects comprising:
(a) a substrate,
(b) a first layer of a resinous polymer composition,
(c) a pattern or design, printed on the surface of the first layer and having two or more distinguishably different colored, printed portions, and
(d) a second layer of a resinous polymer composition, overlying the surface of the printed first layer, in contact therewith, and containing a plurality of variously colored transparent, translucent and/or opaque particles, substantially, uniformly dispersed throughout said second layer.

The particle colors, which can be similar to, analogous to and, in a preferred embodiment, in contrast with the colors of the underprinted pattern or design, are selected in such a manner that, when the finished product is viewed, the colors of the underprinted pattern or design show through the transparent or translucent areas of the second layer, and combine with the colors of the particles to produce varying shades of colorations which differ from one area to another and are different from the colors of the underprint. The resulting sheet material product exhibits an inlaid appearance with the illusion of three-dimensional depth.

17 Claims, 1 Drawing Sheet

UNDERPRINTED INLAID SHEET MATERIALS HAVING UNIQUE DECORATIVE DESIGN EFFECTS

FIELD OF THE INVENTION

The present invention relates to decorative sheet materials and the like. More particularly, the invention is concerned with the decorative effects obtained by using a combination of clear and variously colored decorative particles applied over a substrate printed with similar and analogous colors to produce realistic, attractive inlaid patterns for floor and wall covering products.

BACKGROUND OF THE INVENTION

Sheet materials, in particular, sheet vinyl flooring products, made with chips or other particulate material, are commonly referred to as inlaids. Inlaid floorcoverings are normally characterized as those which maintain their decorative appearance as the surface is worn or abraded away. This characteristic makes such products particularly suitable for use in commercial areas where significant wear is encountered. These products and processes for their manufacture are well known in the floorcovering business and originate back to the early linoleum times where through-patterned floorcoverings, based on linseed oil, cork dust and resins were developed by the industry. The process was later modified for vinyl.

Vinyl inlaid floorcovering consists of coarse, colored particles, such as chips or dry blends, which are "laid on" a substarate and then sintered by heat, or "laid in" a transparent or translucent liquid or solid matrix and fused by heat and/or pressure. The chips are produced from pre-gelled or fused, spread, calendered or extruded compounds cut into geometrically regular profiles or ground into randomly shaped particles.

The dry blends are made by mixing fine PVC powder with pasticizer, filler and color pigments and heating above the PVC compound's softening temperature. The small original particles "grow" and form a loose, porous, coarse, fluffy mass.

Currently, to produce registered inlaid patterns for sheet vinyl, conventional manufacturing procedures distribute the coarse particles on the substrate in diffrent steps with the help of area-complementary stencils, followed by topcoating with a clear wearlayer. This method is complicated and can only be used to produce large geometric patterns.

Modern inlaids generally fall into two classifications: resilients and non-resilients. Resilients include a substantially continuous layer of foam and are usually made by incorporating solid particulate material into a plastisol coating, followed by gelling and fusing. Non-resilients do not contain a foam layer and usually are made by sintering and/or calendering, or otherwise compacting, particulate material.

The non-resilient products commercially offered are those containing large (about ⅛ inch) square chips in a clear matrix and those containing small (about 0.004 inch) dry blend resin particles made by sintering and/or compacting normal dry blend resins.

While construction of inlaid products by compaction from discreet chips or particles (normally of different colors) offers distinct styling opportunities, a significant premium is paid in terms of expensive, cumbersome equipment. Furthermore, the nature of the process restricts the range of designs available. For example, in order to effect specific registered pattern definition, it is necessary to deposit chips of different colors in preselected areas on the sheet. This is difficult mechanically, and results in a slow cumbersome process which does not produce finely defined designs.

Some of the inherent difficulties in current production techniques for non-resilient inlaids have been minimized by use of increasingly sophisticated materials and design techniques, such as using fine particle size, dry blend resins, printing over the surface of the resulting inlaid product and, optionally, embossing, with and without application of a wearlayer. Unfortunately, whereas the use of the finer particle size preserves the specific characteristic of an inlaid product, i.e. the pattern does not change as the product wears through, overprinting the product, whether or not a wear layer is applied, essentially negates this charecteristic because wearing through the print layer essentially destroys the pattern. This eliminates the product from commercial, high-use environments and limits its utility principally to styling effects in residential and related applications.

Resilient inlaids are usually made by embedding ground plastic particulate material in a plastisol coating. U.S. Pat. No. 4,212,691 exemplifies such products and methods for their manufacture. One of the limitations of such technology, as taught, for example, in U.S. Pat. No. 4,126,727, is the substantially uniform appearance of relatively small decorative particles, chips or flakes produced by simply dispersing them uniformly in the wear layer.

It is, therefore, a principal purpose and object of this invention to provide real through-patterned inlaids and, in particular, inlaids with registered patterns, having heretofore unobtainable decorative effects. It is also an important purpose and object of this invention to provide a novel process for producing such inlaids which is believed to be simpler than current inlaid production technology. Other purposes and objects of the invention will be apparent from the following discussion.

SUMMARY OF THE INVENTION

The foregoing and other purposes and objects of this invention are accomplished by providing a resinous polymer sheet material having selective, decorative effects in selected portions thereof which comprises:
 (a) a substrate,
 (b) a first layer of a resinous polymer composition,
 (c) a pattern or design, printed on the surface of the first layer and having two or more differentiable or distinguishable, colored, printed portions and
 (d) a second layer of a resinous polymer composition, overlying the surface of the printed first layer, in contact therewith, and containing a plurality of transparent, translucent and/or opaque, variously colored particles, substantially, uniformly dispersed throughout said second layer, the colors of which are chosen to produce unique visual effects, more fully described hereinafter;

The colors of the particles are similar to, analogous to and, preferably; in contrast with the colors of the printed pattern or design so that, when the finished product is viewed, the colors of the underprinted pattern or design show through the transparent or translucent areas of the second layer and combine with the color of the particles to produce varying shades of colorations which differ from one area to another and are different from the colors of the underprint. Additionally, the transparent or transluscent particles and the transparent or transluscent, preferably clear, void spaces therebetween, provide a unique three-dimensional optical effect of visual depth. This effect, in most cases, is further enhanced by the above described color variation effect.

The result is a registered, inlaid appearance, obtained using a uniform blend of particulates. Thus, the compositions of this invention and the processes for their manufacture overcome the previously discussed limitation of prior art technolgy, i.e. that only a substantially uniform appearance has, to date, been obtainable, when such uniform particle blends are employed to produce inlaids.

As discussed more fully hereinafter, additional wearlayers of both PVC and/or polyurethane polymers), registered reliefs, backcoatings and other finishing embodiments conventionally employed in the production of floor or wall covering products can be utilized, provided that such embodiments do not interfere with or significantly detract from the visual effects and registered, inlaid patterns produced in accordance with this invention.

DESCRIPTION OF THE DRAWINGS

FIG. 1 is not drawn to scale and, therefor, is not intended to represent precise dimensional relationships. As shown, FIG. 1 is drawn to clearly illustrate the structure of the product layers as they appear in a typical final product of this invention. In this view it is not intended that the thickness of the various layers be precisely represented. Rather, the various layers are represented on a scale which is intended to more clearly illustrate the details of smaller portions and to accentuate some of the more important features of the present invention.

DETAILED DESCRIPTION OF THE INVENTION

Substrate

Figure 1:
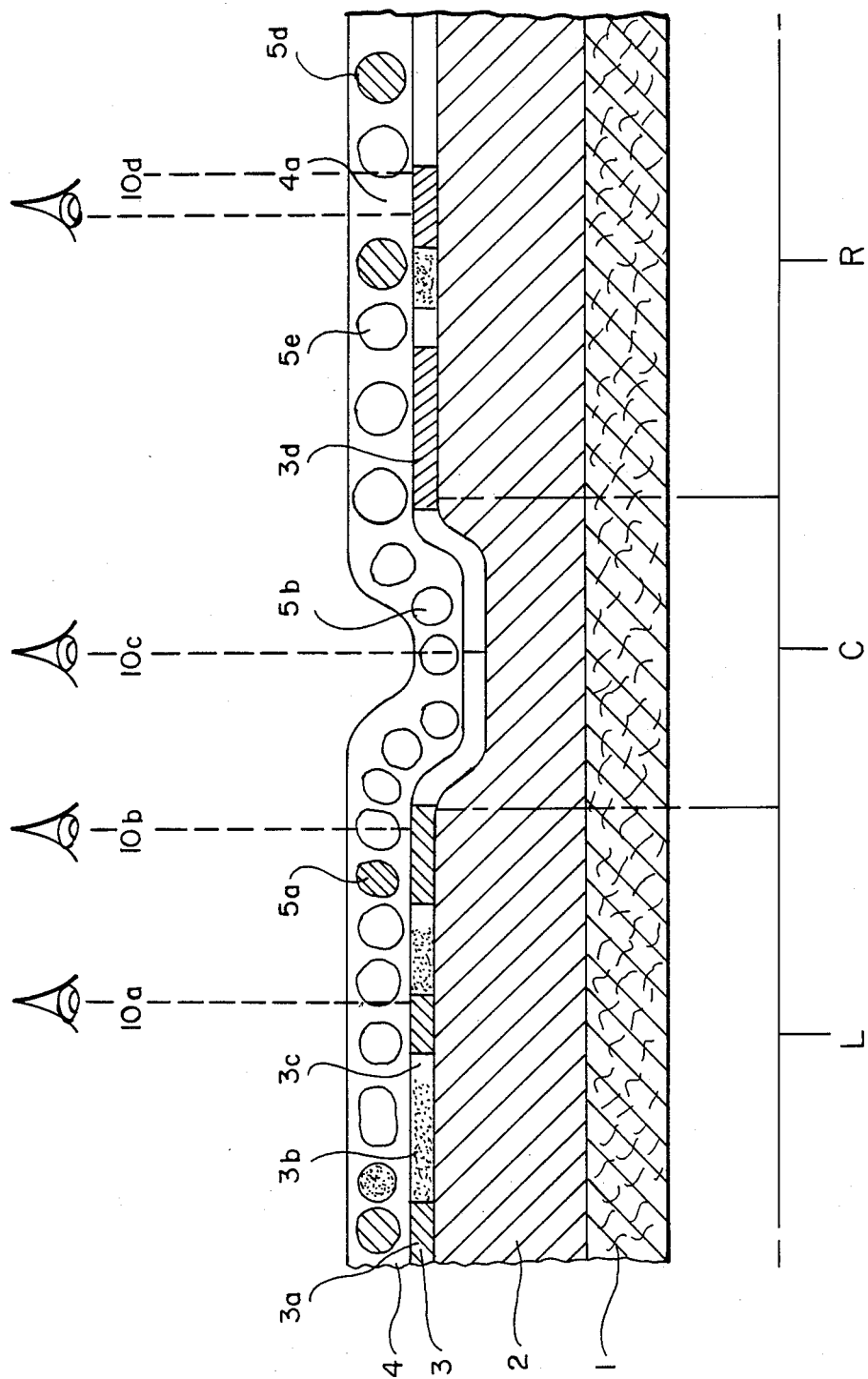
FIG. 1 is a fragmentary, cross sectional view of a typical final product of the present invention.

In the ensuing discussion, numerical designations of the individual compositions and components of the products of this invention refer to coresponding numerical designations in FIG. 1.

The substrate 1 is a relatively flat fibrous or nonfibrous backing sheet material, such as a fibrous, felted or matted, relatively flat sheet of overlapping, intersecting fibers, usually of non-asbestos origin. The substrate can, if desired, be asbestos or non-asbestos felts or papers, woven or non-woven; knitted or otherwise fabricated textile material or fabrics comprised of cellulose, glass, natural or synthetic organic fibers, or natural or synthetic inorganic fibers, or supported or non-supported webs or sheets made therefrom or filled or unfilled thermoplastic or thermoset polymeric materials. These and other substrate or base materials which can be employed in this invention are well known in the art and need not be further detailed here.

Substrate Coating

Although the use of a sealing or priming coat is not considered essential, it is preferred, especially where a glass fiber mat or certain felt base materials are used.

Thus, the substrate or base material, optionally, can be coated to improve the print quality of the substrate. Such coatings can be plastisols, organosols, lacquers, filled or unfilled latex coatings, or other coatings conventionally employed as preprint sealants in the manufacture of floor or wall covering products.

As used herein, the term "plastisol" is intended to cover a relatively high molecular weight polyvinyl chloride resin dispersed in one or more plasticizers. The plastisol upon heating or curing forms a tough plasticized solid. For purposes of the present invention, plastisol compositions are intended to include organosols, which are similar dispersed polyvinyl chloride resin materials that, in addition, contain one or more volatile liquids that are driven off upon heating.

Those skilled in the art will appreciate that, in addition to the basic resin constituents, other commonly employed constituents can be present in the plastisol compositions in minor proportions. Such other constituents commonly include heat and light stabilizers, viscosity depressants, and/or pigments or dyes, the latter in order to contribute color to the polyvinyl chloride resin.

Typically the substrate coating employed in the products of this invention is a resinous polymer composition, preferably, a polyvinl chloride plastisol which is substantially uniformly applied to the substrate surface, for example by means of a conventional reverse roll coater or wire wound bar, e.g. a Meyer Rod Coater, wherein the grooves provided by the wires assist in metering the flow of the plastisol. The particular means for applying the substrate coating to the surface of the substrate is not critical to practice of the invention and any suitable coating means can be employed. Exemplary of other coating means are a knife-over roll coater, a rotary screen, a direct roll coater and the like.

The thickness of the resinous polymer composition or plastisol, as it is applied to the surface of the substrate, is substantially uniform, and is in the range of about 3 mils to about 30 mils, 5 mils to about 10 mils being especially preferred. The substrate can be thinner or thicker as may be required by the particular product application.

Although the preferred and typical substrate coating is a polyvinyl chloride homopolymer resin, other vinyl chloride resins can be employed. Exemplary are a vinyl chloride-vinyl acetate copolymer, a vinyl chloride-vinylidene chloride copolymer, and copolymers of vinyl chloride with other vinyl esters, such as, vinyl butyrate, vinyl propionate, and alkyl substituted vinyl esters, wherein the alkyl moiety preferably is lower alkyl containing between about 1–4 carbons. Other suitable synethetic resins such as polystyrene, substituted polystyrene, preferably wherein the substituents are selected from the group consisting of alkyl ($C_1$–$C_{10}$, preferably $C_1$–$C_4$), aryl (preferably, $C_6$–$C_{14}$), polyolefins such as polyethylene and polypropylene, acrylates and methacrylates, polyamides, polyesters, polyurethanes and any other natural or synethetic resin capable of being applied to the substrate or base coatings of this invention to provide a smooth and uniform surface and/or to improve the print quality of the substrate or base coating surface, are also applicable; provided such resin is otherwise compatible with the overall product composition and, therefor, within the principles of this invention. Thus, it is not essential that a plastisol always be used. Organosols and aqueous latices (aquasols and hydrosols) are also of use, employing as the dispersing or suspending media, organic solvents and water, respectively, rather than plasticizers, as in the case of a plastisol.

Where the preferred plastisol is employed, typical of the plasticizers which can be used are dibutyl sebacate, butyl benzyl sebacate, dibenzyl sebacate, dioctyl adipate, didecyl adipate, dibutyl phthlate, dioctyl phthlate, dibutoxy ethyl phthlate, butyl benzyl phthlate, dibenzyl phthlate, di(2-ethylhexyl) phthlate, alkyl or aryl modified phthalate esters, alkyl, aryl, or alkylaryl hydrocarbons, tricresyl phosphate, octyl diphenyl phosphate, dipropylene glycol dibenzoate, dibasic acid glycol esters, and the like. Other constituents of the resinous substrate coating can include a blowing or foaming agent such as azodicarbonamide (if a blowing or foaming procedure is desired), conventional stabilizers/accelerators, initiators, catalysts, etc., such as zinc oleate, dibasic lead phosphite, etc., conventional heat or light stabilizers, such as metallic soaps, etc., UV absorbers, colorants, dyes or pigments, notably, titanium oxide, solvents and diluents, such as methyl ethyl ketone, methyl isobutyl ketone, dodecyl benzene, etc., fillers, such as clay, limestone, etc, viscosity modifiers, antioxidants, bacteriostats and bacteriosides, and the like.

Gellation Step

After the substrate coating has been applied and adhered to the substrate, it is then heated in an oven, or other suitable heating apparatus, maintained at an elevated temperature of from about 240° F. to about 450° F., and preferably from about 260° F. to about 410° F., for a period of time of from about 1 minute to about 5 minutes, whereby it gels and becomes firm. The temperature and the time are interdependent; the higher the temperature, the shorter the time and vice versa. During this step the elevated temperature, however, is maintained below that point at which decomposition of any blowing or foaming agent which may have been included in the formulation of the substrate coating occurs.

Printing of the Gelled Substrate Coating

After the substrate coating is gelled and firmed in accordance with the process of this invention, it is cooled and then printed or coated with a suitable printing ink composition 3, FIG. 1, in an appropriate pattern or design. In a preferred embodiment, a minimum of two colors and, preferably, three or more colors, which can include the substrate color, provided that it is not completely and opaquely overprinted, are used in such pattern or design to achieve an exceptionally realistic inlaid look. This is illustrated in FIG. 1 wherein the four colors 3a, 3b, 3c and 3d are shown printed in a typical pattern. As shown in FIG. 1, the left hand portion L of the pattern contains colors 3a, 3b and 3c only; the center portion C contains color 3c only, and the right hand portion R contains colors 3b, 3c and 3d only.

Suitable inks include those normally used in the manufacture of floor covering, preferably resilient floor covering. These include plastisol, solvent based systems and water based systems. Such systems can include a chemical suppressant in those cases where the substrate to which the ink is to be applied is a foamable plastisol or organosol. Such suppressants are well known in the art (e.g. see U.S. Pat. No. 3,293,094).

Printing onto the substrate can be effected by rotogravure, flexigraphic, screen printing, or other printing techniques conventionally employed in making floor or wall covering products. Normally printing is effected by means of one or more suitably engraved printing rolls and associated back-up rolls. Compositions, thicknesses and methods used in applying these optional components may be as conventionally known in the art, including, for instance, but not limited to, those described in U.S. Pat. No. 3,458,337.

Application of the Adhesive Layer and Decorative Particles

The printed, gelled, coated substrate is then coated with a suitable wet PVC plastisol or organosol. The particular means used for applying the adhesive is not critical and any suitable device may be used. Exemplary are reverse roll coaters, knife-over-roll coaters or other similar devices. The thickness of the ungelled adhesive layer prior to application, or deposition, of the decorative resinous particles of this invention is between about 3 and about 40 mils, preferably, between about 5 and about 20 mils.

The adhesive layer is normally a PVC plastisol or organosol containing a plasticizer system, associated diluents, viscosity control aids and stabilizers. Those discussed above are exemplary. The adhesive can contain colors in the form of dyes or pigments, provided that such colors do not render the adhesive layer opaque, i.e. the underprinting of this invention is discernible therethrough.

Other homopolymers and copolymers of vinyl chloride, (i.e. vinyl resins other than a plastisol or organosol) such as those discussed above, can also be employed, and, therefore, the discussion herein and the examples setting forth the use of PVC plastisols is intended to be exemplary and non-limiting. It is only because of current economics and availability that the examples set forth herein have used polyvinyl chloride plastisols.

Decorative Particles

The decorative resinous particles of this invention are deposited onto the gelled and printed substrate with the ungelled adhesive top coating. The method of application is not critical and can be by any suitable means which essentially uniformly deposits the particles onto the surface of the ungelled adhesive coating in an essentially single layer. This can be conveniently accomplished using a vibrating pan feeder device, such as the SYNTRON vibratory feeder made by FMC Corporation.

To obtain the desired inlaid appearance of the products of this invention, the resinous particles must adequately cover the surface of the adhesive coated substrate. In general between about 40% and about 80% surface coverage is required. For single layer of uniformly sized spherical particles, the maximum coverage obtainable can be shown mathematically to be 78.5%. In the case of other particle shapes, there may be some overlapping and, consequently, maximum coverage cannot be determined mathematically, weight and/or visual examination being used to control coverage within the ranges specified.

The resinous decorative particles of this invention can be of a variety of materials, PVC, PVC plastisols and organosols and the like being preferred. These particles can be of various sizes and geometric shapes, spherical and essentially spherical (sometimes referred to herein as "spheroidal"), being one especially preferred shape. The thickness of the particles must be substantially the same as the thickness of the combined adhesive and decorative particle layer which is normally from about 10 and about 60 mils and, preferably, from about 30 to about 50 mils. The ratio of the thickness of the particles to the thickness of the adhesive matrix typically falls within the range of between about 50% and 100% and preferably between about 70% and about 95%.

The decorative particles of this invention are employed in a blend made up of transparent, transluscent and/or opaque particles comprising a plurality of colors, plus, optionally, clear particles. At least some of the particles, or the matrix, must be sufficiently transparent or sufficiently transluscent, to permit the underprinting described herein to show through so that the underprinting is discernible by visual observation with the naked eye, preferably, from at least an arms-length distance, e.g. between about 1 to about 5 feet.

A substantial portion of the colors of the colored particles are similar to or analogous to (as these terms are conventionally used in color physics, and as more particularly defined herein) the colors of the underprinting described herein, so as to provide the illusion of depth characteristic of real inlaid products. Typically, the color difference between the color of the particles and the similar color of the underprint is between about 0 and about 10 CIE units, preferably between about 2 and about 5 CIE units. For production of exceptionally realistic inlaid products, one particle color must closely match the color of that portion of the underprint which particles of such color overlie, e.g. within about 0 to about 10 CIE units, and at least one other particle color must be "analogous" (as that term is defined herein) to the color of that portion of the underprint which particles of such color overlie, e.g. within about 10 to about 20 CIE units. (The CIE cylindrical coordinate system for describing color space is described more fully hereinafter.)

Discreet spheroidal particles provide enhanced visual effect of depth and improved wear characteristics. Illustrative of those spheroidal particles which are especially preferred are the particles and the methods for their manufacture taught in U.S. Pat. No. 3,856,900. This procedure is particularly convenient for the production of relatively small plastisol beads or "pearls" having a particle size of generally about 0.030 inch or smaller.

For smaller particles and those ranging up to about 0.40 inch, these can be obtained by screening the oversized particles from normal suspension grade resin production or by making special particle sizes, for example, in accordance with U.S. Pat. No. 3,856,900. Particles in this size range are particularly useful for achieving certain desireable design effects. Such procedures are also capable of making smaller particle sizes, for example, ranging from about 0.015 inch to about 0.125 inch, (e.g. see U.S. Pat. No. 3,345,235), but in the case of spheroidal particles, the procedure of U.S. Pat. No. 3,856,900 is preferred.

Another particularly desireable particle shape is chips or flakes, characterized by one dimension being significantly smaller than the other two. For example, such shapes may range from 30 to 250 mils in the two larger dimensions, provided that the area of each individual particle does not exceed 15,000 mils$^2$, and from about 7 to about 15 mils in thickness. Such chips or flakes also offer specific design effects. Those approaching 250 mils in both larger dimensions are too large to give the desired through-patterned inlaid appearance, resulting, instead in a "sprinkled on" impression.

The chips or flakes utilized in this invention are conveniently prepared from gelled plastisol sheets by grinding or chopping. These sheets are normally prepared by coating onto a release paper and gelling at conditions previously described and then stripping from the release paper. The plastisol stock can contain a conventional blowing or foaming agent, in which case the temperature of the gellation step is restricted, as previously described, to prevent activation or decomposition of the blowing agent.

Two typical and preferred chip formulations are:

Solid Chip

| Solid Chip Stock | Parts By Weight |
| --- | --- |
| PVC Homopolymer Dispersion Resin, RV = 3.0 | 55 |
| PVC Homopolymer Dispersion Resin, RV = 1.90 | 45 |
| Barium/Zinc Stabilizer | 4.6 |
| Epoxy Soya Oil | 7 |
| Mineral Spirits | 3 |
| Texanol Isobutyrate | 1.7 |
| Glycol Butyrate Benzoate | 32 |

Foamable Chip Stock

| Foamable Chip Stock | Parts By Weight |
| --- | --- |
| PVC Homopolymer Dispersion Resin, RV = 3.0 | 56 |
| PVC Homopolymer Dispersion Resin, RV = 1.90 | 44 |
| Glycol Butyrate Benzoate | 44 |
| Mineral Spirits | 5 |
| Zinc Oxide/Cadmium Oxide Stabilizer Catalyst | 0.5 |
| Azodicarbonamide | 2.5 |
| Titanium Dioxide | 7.5 |
| Epoxy Soya Oil | 6.0 |

In general the particles employed in this invention can have a wide variety of geometric shapes. Exemplary of other geometric shapes are squares, triangles, circles, annuli, other polygons, etc., or irregular sizes and shapes, or a mixture of any or all of such shapes, including spheroidal. The method of preparation of the decorative resinous particles or the specific formulation thereof is not critical to the practice of this invention. Any particles, falling within the parameters discussed herin, and conventionally employed in making inlaid floor and wall covering products can be used.

Colors and Pattern Detail

Through the proper combination of particle geometry, particle colors, underprinting colors and appropriate positioning thereof into patterns or designs, which are in register with and permit the colored underprinting to show through, this invention creates unique optical effects, visually discernible by the naked eye, and provides realistic and true inlaid products. A typical and representative example of such a combination is shown diagrammatically in FIG. 1.

Referring to FIG. 1, it can be seen that there is included in the underprinting at least one color, ink 3$b$ which will provide an underlying tone value by virtue of its presence in essentially all areas of the pattern (grout or other feature lines, optionally, excluded) and which, when viewed around overlying particles 5$a$, 5$b$, 5$c$ and 5$d$, provides an illusion of depth, i.e. a three-dimensional, optical effect. At least two other underprint colors, represented by inks 3a and 3b, are necessary to provide the desired contrast between adjacent pattern areas (which may, optionally, be further separated by a grout or other feature or detail line). In a preferred embodiment these colored printed patterns or designs are not continuous prints within the respective pattern or design areas, but, rather, are broken and random and of a size where the narrowest dimension of any localized area of print does not exceed approximately 4 times the diameter of the largest spherical particle or the largest visible dimension of other shapes. Thus, when the underprinting is viewed through transparent or transluscent particles or through the transparent or transluscent adhesive matrix the observer is given the impression of a cluster of similar sized particles. In FIG. 1 this phenomenon is exemplified by viewing positions 10a, 10b, 10c and 10d. At least one particle color and, preferably, two or more, therein exemplified by particle 5a, must be similar to, or analogous to, one of the underprint colors, therein exemplified by color 3a, and analogous to the other underprint colors providing the desired contrast between adjacent pattern areas, therein exemplified by color 3d. The colors of the other particles overlying, but not necessarily in register with, the inks used in the underprint pattern or design 3 are not critical. Particle 5b is representative. It, of course, is preferred that the colors of such non-critical particles be artistically compatible with the colors of the overall pattern or design and that such colors provide a continuity of color and shade throughout the entire pattern or design in such a way that the underprint will emphasize or enhance a specific or selected pattern or design area by increasing the total area of its constituent color. Furthermore, in an especially preferred embodiment of this invention, particles of at least one color, represented by particles 5d in FIG. 1, which contrasts with the colors of the other particles employed, are utilized to enforce the particulate nature of the inlaid final product. Transparent or transluscent particles 5e or open expanses 4a of the transparent or transluscent matrix 4, not exceeding 5 times the diameter (or largest dimension if non-spherical) of the decorative particles, are also necessary to allow the underprint to be visible to the naked eye, when viewed from the distances discussed herein.

Additionally, the ratio of transparent to colored particles affects the visibility of the printed pattern underneath the particle-containing, adhesive matrix. Generally, 50% or less, and preferably 0–30%, transparent to colored particle loading is preferred. The amount actually used depends upon the type of end-use application and design effect desired. Good results have even been achieved in the range of 0–10% transparent to colored particle loading.

The CIE (Commision Internationale de l'Eclairage) Cylindrical Coordinate System (CIE System) for describing color space is well known and conventionally employed in color technology. (See, for example, "Principles of Color Technology", F. W. Billmeyer and M. Saltzman, Second Edition, John Wiley and Sons, New York, New York.) The CIE System is based upon a mathematical treatment wherein color differences are expressed in CIE units and is employed herein to simplify the definition of terms and the specification of limits of the invention.

The term "similar" colors in color technology and as used herein means monochromatic or the same hue, differing only in shade (lightness). According to the CIE System, this means the same a* value, along the red-green axis, the same b* value, along the yellow-green axis, and varying L* values, along the lightness axis. The "same" values, for commercial purposes, usually means a color difference less than two CIE units (the eye cannot determine a difference less than one unit).

"Analogous" colors in color technology and as used herein are those adjacent in color space. For purposes of this invention, these are defined as having a total color difference up to 15 or 20 CIE units, and generally having the same sign (positive or negative) on both values of a* and on both values of L*.

"Contrasting" colors have a greater difference than those set forth above and "complementary" colors generally have color differences falling within the above ranges, but opposite signs for each a* value and b* value, which is to say, they are on the opposite sides of color space in the CIE System.

For purposes of this invention, it is preferred to define the "same" or "similar" colors as those having a difference in hue (delta H) of less than 10 CIE units and, preferably, less than 7 CIE units. "Analogous" colors have a total color difference (delta E) of less than 20 CIE units and, preferably, less than 15 CIE units. "Contrasting" colors have a total color difference (delta E) greater than 20 CIE units and also have the same sign for each a* value and for each b* value (unless the values are close to 0.0, i.e. less than an absolute value of 2.0, whereupon they have opposite signs). "Contrasting" colors have a total color difference (delta E) greater than 20 CIE units and opposite signs for each a* value and each b* value.

Wearlayer

The optional overcoat or wearlayer is preferably a plastisol of the same or similar type as that discussed above in connection with the resins employed in the substrate coat and the adhesive layer or matrix. The formulations generally include materials to enhance special specific properties, for example gloss, wear, stain resistance, and scuff resistance.

Other resins suitable for use as a top coating can be employed. Exemplary are wear resistant polyurethanes, such as those described in U.S. Pat. No. 4,087,400.

Thus in another embodiment of this invention the decorative, inlaid floor or wall coverings comprise:

(a) a flexible mat substrate, (b) a gelled, resinous print layer, applied over said substrate, the surface of which is printed with one or more inks suitable for use in the manufacture of floor or wall covering products, and having two or more distinguishably different, colored, printed portions, (c) an adhesive matrix, overlying said print layer, containing an effective amount of a homopolymer or a copolymer of vinyl chloride, in which are embedded a plurality of transparent, transluscent and/or opaque, variously colored resinous particles (optionally, some of which can be clear), substantially, uniformly dispersed throughout said adhesive matrix, the colors of which are chosen to produce unique visual effects, as more fully described hereinabove, at least some of which permits the underprint to show through, and (d) an optional topcoating or wearlayer or wearlayers, selected from the group consisting of a plastisol, a polyurethane resin or a suitable mixture of each.

The following examples are intended to demonstrate preferred embodiments of this invention without limiting the scope thereof. In the following examples all parts and percentages are by weight.

EXAMPLE 1

Residential Floorcovering with Registered Printed and Embossed Red Brick Pattern (Chemically Embossed)

A floorcovering substrate sheet of convential type non-asbestos felt (Tarkett Inc., Whitehall, Pa.) approximately 32 mils thick was coated with a foamable plastisol the composition of which was as follows:

|  | Parts by Weight |
| --- | --- |
| dispersion: k value 65 (Occidental FPC 605) | 70 |
| PVC extender resin: k value 60 (PLIOVIC M-50) | 30 |
| Di(2-ethylhexyl) phthlate | 28 |
| Butyl benzyl phthlate | 15 |
| Texanol isobutyrate (TXIB) | 15 |
| Titanium dioxide | 10 |
| Azodicarbonamide | 2.5 |
| Kerosene | 4 |
| Zinc oxide | 1.5 |
| Viscosity: 2500 cps | |

The coated substrate is then pregelled in a hot oven at 275° F. for 2.5 minutes. The surface is then gravure printed on a flat bed press using SERIES 125 solvent based inks from American Inks, Inc. The inks used to cover the plate printing the valley areas of the pattern (i.e. the grouts) contain, additionally, 140 parts benzotriazole, a chemical suppressant, to inhibit in these selected areas the expansion of the foamable plastisol. The pattern is a brick printed in predominately red coloration. The pattern is separated into 5 colors, the true mass tone color values of which are:

| Separation | CIE | | |
| --- | --- | --- | --- |
|  | L* | a* | b* |
| Salmon Background | 49.79 | 18.08 | 10.89 |
| Maroon Highlight | 37.04 | 12.12 | 3.48 |
| Orange Highlight | 43.21 | 20.15 | 19.97 |
| Brown Highlight | 33.37 | 4.71 | 7.67 |
| Gray Grout | — | — | — |

After drying in warm air at about 140° F., an adhesive layer about 10 mils thick is applied by drawdown bar and an excess of premixed plastisol pearls (produced by the process of Example 4 and having the composition set forth herinafter), having the following blend of specific colored and clear particles, are evenly distributed on the surface of the wet, tacky adhesive layer from a vibrating pan (SYNTRON vibrator, manufactured by FMC Corporation).

The composition of the adhesive mix is:

|  | Parts by Weight |
| --- | --- |
| PVC dispersion: relative viscosity 2.05 (Occidental FPC 6458) | 70 |
| PVC extender: k value 60 (PLIOVIC M-50) | 30 |
| Butyl benzyl phthlate | 25 |
| Di-isononyl phthlate | 25 |
| Stabilizer, barium-zinc type (SYNPRON 1665) | 4 |

The composition of the pearl particles is:

| Parts by Weight | Colored | Transparent |
| --- | --- | --- |
| Suspension grade PVC resin: k value 65 (PEVIKON S658 GK) | 100 | 100 |
| Butyl benzyl phthalate | 40 | 40 |
| Stabilizer, barium-zinc type (SYNPRON 1665) | 4 | 4 |
| Titanium dioxide | 5 | — |
| Color-pigment (Purchased blend of red iron oxide, yellow iron oxide and carbon black dispersed in di(2-ethylhexyl) phthalate) | 5 | 5 |

The PEVIKON S658 GK resin has an aspect ratio of about 1 (the particles are round) and the particle size, by microscopic observation, averages about 600 microns (approximately 30 mesh). Screen analysis is as follows:

| Mesh | % Retained |
| --- | --- |
| 28 (589 microns) | 68.0 |
| 65 (208 microns) | 25.2 |
| 100 (147 microns) | 1.4 |
| Thru 100 mesh | 5.4 |

The blend ratio and color value of the pearl particles are:

| Parts by Weight | CIE | | |
| --- | --- | --- | --- |
|  | L* | a* | b* |
| Clear | — | — | — |
| White | 84.11 | −1.68 | 9.66 |
| Orange | 46.28 | 18.26 | 25.63 |
| Brown | 30.83 | 5.10 | 4.20 |
| Almond | 53.26 | 6.46 | 12.79 |

The excess pearls, which are not wetted by the adhesive coating and embedded therein are blown away by a gentle air stream. The resultant grainy matrix is then gelled by contacting the coated side against a heated chromium drum (350° F.) and smoothed between a rubber pressure roller and the drum surface. The thickness of the matrix containing the adhesive coat (10 mils) and the embedded pearls (approximately 20 mils) is 30 mils.

The surface of the matrix is then bar coated using a drawdown bar with a transparent plastisol wearlayer having the following composition:

|  | Parts by Weight |
| --- | --- |
| Dispersion grade PVC, relative viscosity 2.05 (Occidental FPC 6458) | 100 |
| Isobutyric acid and glycol ester of benzoic acid (Tenneco NUOPLAZ 1538) | 56 |
| Stabilizer, barium-zinc type (SYNPRON 1665) | 5 |
| Epoxidized soybean oil | 5 |
| Kerosene | 2 |
| Brookfield Viscosity: ~1200 cps | |

The wearlayer is fused in a hot air oven at about 380° F. for 3 minutes. The floorcovering produced exhibits a relief structure (embossing) in register with the printed areas. The decorative inlaid product thereby produced has an overall thickness of about 82 mils and exhibits excellent wear and exceptional three-dimensional inlaid design characteristics, particularly with respect to visual depth.

In the foregoing example it is noteworthy that, in accordance with the principles of this invention, there is similarity in hue (i.e. the CIE a* and b* values) between the orange highlight underprinting (20.15, 19.97) and the orange pearls (18.26, 25.63) and between the brown highlight underprinting (4.71, 7.67) and the brown pearls (5.10, 4.20). The almond pearls (6.46, 12.79) provide a pleasing combination with the salmon background underprinting (18.08, 10.89), almond being an analogous color differing from salmon only in being less "red". The white pearls add contrast and accentuate the visual granular texture of the product.

EXAMPLE 2

Residential Floorcovering with Registered Printed and Embossed White Brick Pattern (Chemically Embossed)

The procedure of Example 1 is repeated in a predominately white coloration. The same pattern separations are used, with the exception that printing is carried out using an ink having the following true mass tone color values:

|  | CIE | | |
| --- | --- | --- | --- |
| Separation | L* | a* | b* |
| White Background | 96.52 | −1.83 | 1.68 |
| White Highlight | 70.99 | 0.81 | 5.19 |
| White Highlight | 71.91 | −0.75 | 0.78 |
| White Highlight | 54.13 | 0.94 | 3.32 |
| White Grout | — | — | — |

After drying, an adhesive layer is applied and an excess of premixed plastisol pearls having the following blend of colors is evenly distributed on the surface:

|  | CIE | | |
| --- | --- | --- | --- |
| Parts by Weight | L* | a* | b* |
| Clear | — | — | — |
| White | 84.11 | −1.68 | 9.66 |

The excess pearls are removed and the resultant matrix gelled and then topcoated.

The resulting decorative inlaid product thereby produced exhibits pleasing appearance and visual depth.

When the decorative blend of Example 2 is applied over the print of Example 1 or vice versa, the illusion of a registered inlaid is not obtained. The resultant product appears to simply have a uniform layer of particles distributed over the surface.

EXAMPLE 3

Floor Covering with Overall Pattern Suitable for Commercial Uses

A floor covering substrate sheet of conventional type non-asbestos felt (Tarkett Inc., Whitehall, Pa.), approximately 32 mils thick, is bar coated (wire wound bar) with approximately 3 mils of a layer of white printable plastisol, the composition of which is as follows:

|  | Parts by Weight |
| --- | --- |
| PVC emulsion: relative viscosity 2.05 (Occidental FPC 605) | 70 |
| PVC extender: k value 60 (PLIOVIC M-50) | 30 |
| Di(2-ethylhexyl) phthalate | 30 |
| Butyl benzyl phthalate | 30 |
| Titanium dioxide | 5 |
| Crystalline calcium carbonate | 80 |
| Barium-zinc type stabilizer (IRGASTAB BZ 530) | 3 |

After gelling against a heated chromium drum at 300° F., the resulting smooth surface is gravure printed on a flat print press using SERIES 125 solvent based inks from American Inks, Inc. with a small tile pattern in a predominately tan coloration. The pattern is separated into five colors, the true mass-tone color values of which are:

|  | CIE | | |
| --- | --- | --- | --- |
| Separation | L* | a* | b* |
| Tan Background | 64.67 | 4.57 | 25.64 |
| Brown Texture | 36.17 | 1.30 | 7.68 |
| Burnt Orange Highlight | 40.25 | 12.85 | 19.77 |
| Maroon Highlight | 32.02 | 5.64 | 5.84 |
| Brown Grout | 34.58 | 3.66 | 8.10 |

After drying in warm air at about 140° F., an adhesive layer about 10 mils thick and having the same composition as that used in Example 1 is applied by drawdown bar and an excess of premixed plastisol pearls of the same composition and coloration as those used in Example 1 is evenly distributed on the surface of the wet, tacky adhesive layer from a vibrating pan (SYNTRON vibrator, manufactured by FMC Corporation) and the excess removed. The resulting matrix is gelled and then topcoated using the procedures described in Example 1. The wearlayer is fused in a hot air oven at about 380° F. for 3.5 minutes and then embossed between a cooled embossing roll and a rubber pressure roll.

The resultant product has 15 mils of wearlayer, gives the illusion of registered inlaid particles and has excellent wear characteristics similar to the product of Example 1.

EXAMPLE 4

The plastisol spherical "pearls" used in the foregoing examples are prepared using the following formulations:

| Parts by Weight | Colored | Transparent |
| --- | --- | --- |
| Suspension grade PVC resin, coarse: | | |
| k value 65 (PEVICON S658 GK) | 100 | 100 |
| Butyl benzyl phthalate | 40 | 40 |
| Barium-zinc stabilizer (SYNPRON 1665) | 4 | 4 |
| Titanium dioxide | 5 | — |
| Color-pigment | 5 | — |

In preparing the colored and transparent plastisol composition, the PVC resin (at 70° F.) is charged to a high intensity mixer running at 3500 RPM and mixed until the batch temperature reaches 160° F. (about 10 minutes). The speed of the mixer is then reduced to 500 revolutions per minute and the pigment pastes, plasticizer and stabilizer are added slowly over a period of about 5 minutes. The speed is then increased to 2000-3000 rpm and the material mixed until the batch temperature reaches 260° F. (approximately 15 minutes additional). The speed is then reduced to 500 RPM and the material is mixed until the batch temperature cools to 70°-90° F. (about 30 additional minutes).

The pearls produced are essentially spherical, dry and free running; do not exceed 0.60 inch in diameter, and have a particle size distribution range of 0.004 to about 0.040.

The following table summarizes the process parameters employed:

| Equipment: High intensity mixer 2.6 gal. volume 3 lbs. loading | | |
|---|---|---|
| Elapsed Time Min. | Temperature Degrees F. | Speed Rev/Min |
| 0 | ~70 | 3500 |
| 10 | 160 | 500 pigments, plasticizer and stabilizer added |
| 15 | 260 | 2000–3000 |
| 30 | | 500 cooling |
| 60 | ~70 | — |

Although the forgoing discussion describes this invention in terms of floor or wall covering products, this invention is intended to encompass any covering including, but not necessarily limited to, floor or wall covering, which can be produced in accordance with the process herein described. Also, while the invention has been described with respect to certain embodiments thereof, it will be apparent to those skilled in the art that various changes and modifications may be made without departing from the spirit and scope of the invention.

What is claimed is:

1. An underprinted inlaid sheet product having unique design effects comprising:
   (a) a substrate,
   (b) a first layer of a resinous polymer composition,
   (c) a pattern or design, printed on the surface of said first layer and having two or more distinguishably different, colored, printed portions, and
   (d) a second layer of a resinous polymer composition overlying and in contact with the printed surface of said first layer and containing colored particles having one or more colors substantially uniformly dispersed throughout said second layer, wherein the color differences between the colors of said colored particles and the colors of said printed pattern or design are between about 0 and about 20 CIE units, so that when the finished product is viewed, the colors of said printed pattern or design show through said second layer, and combine with the colors of said colored particles
whereby said sheet product exhibits an inlaid appearance with visual depth.

2. The product of claim 1 wherein said second layer further includes colored particles having one or more colors which differ from the colors of said printed pattern or design by more than about 20 CIE units, provided that a substantial portion of the colors of the colored particles have one or more colors which differ from the colors of said printed pattern or design by less than about 20 CIE units.

3. The product of claims 1 or 2 wherein the majority of the colors of said printed pattern or design do not differ from each other by more than about 20 CIE units.

4. The product of claim 3 wherein the color of one group of colored particles differs from one of the colors of said printed pattern or design by less than about 20 CIE units and differs from at least one other color of said printed pattern or design by less than about 20 CIE units.

5. The product of claim 4 wherein the color of one group of colored particles differs from one of the colors of said printed pattern or design by less than about 10 CIE units and differs from the color of at least one other portion of said printed pattern or design by from about 10 to about 20 CIE units.

6. The product of claims 1 or 2 wherein said colored particles cover from about 40% to about 80% of the surface of said second layer.

7. The product of claim 6 wherein the ratio of the thickness of said colored particles to the thickness of said second layer falls within the range of between about 50% and 100%.

8. The product of claim 7 wherein the ratio of the thickness of said colored particles to the thickness of said second layer falls within the range of between about 70% and about 95%.

9. The product of claims 1 or 2 wherein said colored particles are essentially spheroidal and cover about 78% of the surface of said second layer.

10. The product of claims 1 or 2 wherein said colored particles are chips or flakes ranging in size from about 30 to about 250 mils in the two larger dimensions, provided that each individual particle does not exceed 15,000 mils$^2$ in area and from about 7 to about 15 mils in thickness.

11. The product of claims 1 or 2 wherein said colored particles comprise polyvinyl chloride resin.

12. The product of claims 1 or 2 wherein said colored particles comprise polyvinyl chloride plastisol.

13. The product of claims 1 or 2 wherein the colored particles having one or more colors which differ from the colors of said printed pattern or design by less than about 20 CIE units include
   (i) colored particles having a color difference from the colors of said printed pattern or design of less than about 10 CIE units, and
   (ii) colored particles having a color difference from the colors of said printed pattern or design of from about 10 to about 20 CIE units.

14. The product of claim 13 wherein said colored particles include particles which are selected from the group consisting of transparent, transluscent and opaque particles.

15. The product of claim 14 wherein the ratio of transparent to transluscent colored particles is 50% or less.

16. The product of claim 14 wherein
   (i) the colored particles having a color difference from the colors of said printed pattern or design of less than about 10 CIE units have a color difference from said printed pattern or design of less than 7 CIE units, and
   (ii) the colored particles having a color difference from the colors of said printed pattern or design of from about 10 to about 20 CIE units have a color difference from said printed pattern or design of from about 10 to 15 CIE units.

17. The product of claim 16 wherein the colored particles having a color difference from the colors of said printed pattern or design of less than 7 CIE units have a color difference from said printed pattern or design of between about 2 and about 5 CIE units.

* * * * *